March 6, 1928. 1,661,343
J. PARCQ
SIGNALING APPARATUS FOR VEHICLES, MORE PARTICULARLY FOR MOTOR CARS
Filed Feb. 14, 1924    3 Sheets-Sheet 1

Inventor
J. Parcq
by Langner, Parry,
Card & Langner
Att'ys.

March 6, 1928.  1,661,343
J. PARCQ
SIGNALING APPARATUS FOR VEHICLES, MORE PARTICULARLY FOR MOTOR CARS
Filed Feb. 14, 1924  3 Sheets-Sheet 2
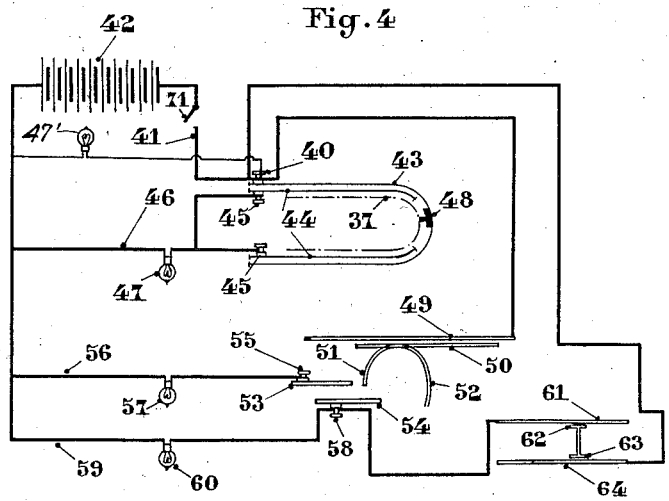
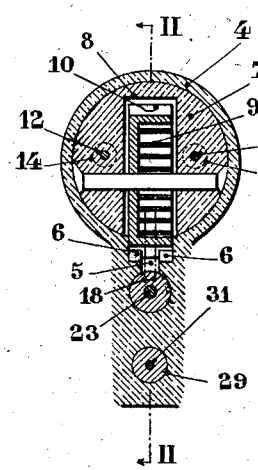
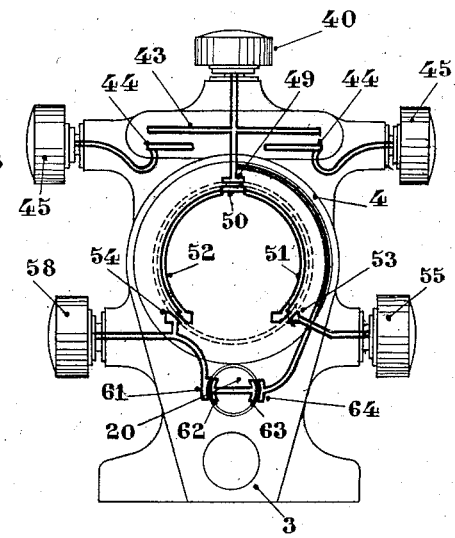
Inventor
J. Parcq
by Langner, Parry, Card & Langner
Attys.

March 6, 1928. 1,661,343
J. PARCQ
SIGNALING APPARATUS FOR VEHICLES, MORE PARTICULARLY FOR MOTOR CARS
Filed Feb. 14, 1924 3 Sheets-Sheet 3
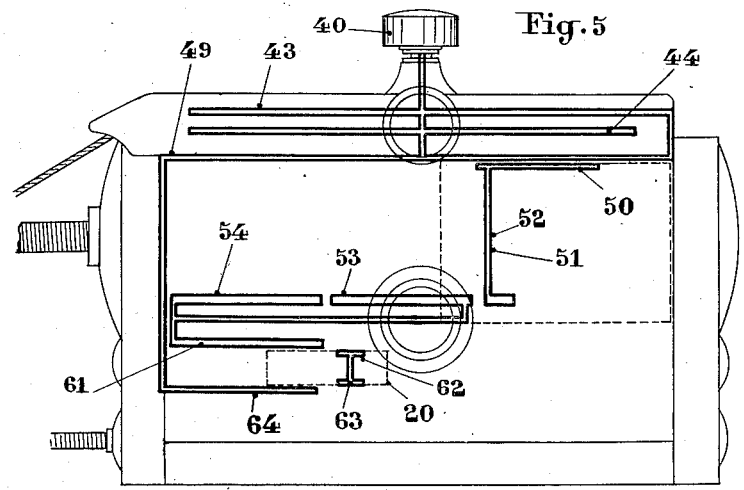
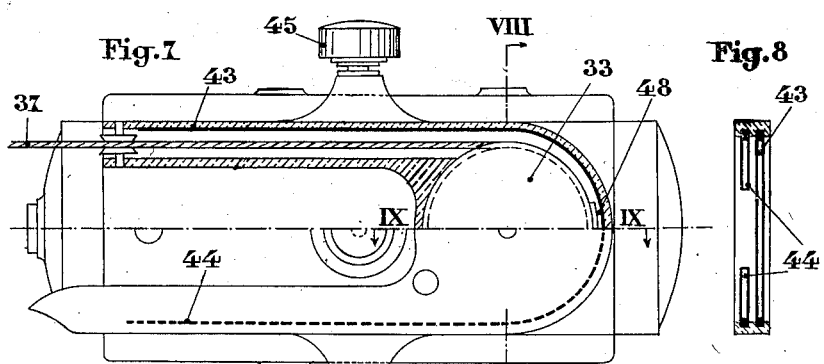
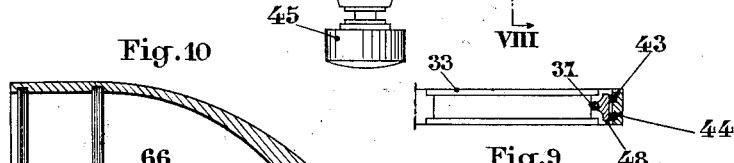
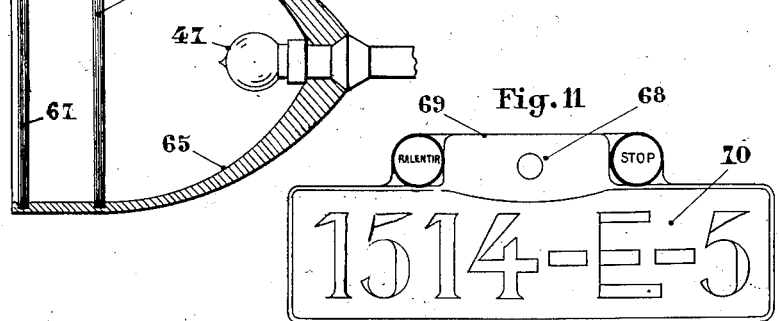
Inventor
J. Parcq
by Langner, Parry, Card & Langner
Attys Patented Mar. 6, 1928.

1,661,343

UNITED STATES PATENT OFFICE.

JACQUES PARCQ, OF PARIS, FRANCE.

SIGNALING APPARATUS FOR VEHICLES, MORE PARTICULARLY FOR MOTOR CARS.

Application filed February 14, 1924, Serial No. 692,857, and in France February 28, 1923.

This invention has for its object to provide an improved signaling apparatus applicable to vehicles and more particularly motor cars.

The improved apparatus is characterized by the feature that it comprises the combination of electrical signals (such as electric lamps) located in circuits of a source of electricity (such as a storage battery) feeding said circuits, and contacts, adapted to close and open said circuits, operated by means of cables or rods connected to the controls (for instance the steering shaft, the brake lever etc.) of the vehicle.

The result of this combination is the automatic operation of each signal on the performance of the corresponding manœuvre (such as slowing down, stopping, turning, etc.).

A practical embodiment of this invention is illustrated (solely by way of example) in the accompanying drawings in which:—

Figure 3 is a partial section taken along line III—III of Figure 2, of the part (hereinafter referred to as the contact apparatus) of the improved apparatus, carrying the contacts for closing and opening the lamp circuits.

Figure 4 is a diagrammatic view of the various circuits of the contact apparatus.

Figure 5 is a side elevation of the contact apparatus.

Figure 6 is an end elevation thereof.

Figure 7 is a plan thereof.

Figure 8 is a section taken along the line VIII—VIII of Figure 7, and,

Figure 9 is a partial section taken along the line IX—IX of Figure 7.

Figure 10 is a section of one of the luminous signals of the improved apparatus, and Figure 11 is an elevation of the plate bearing the registered number of the motor car with a lamp and reflector for illuminating the same at night.

Figure 1:
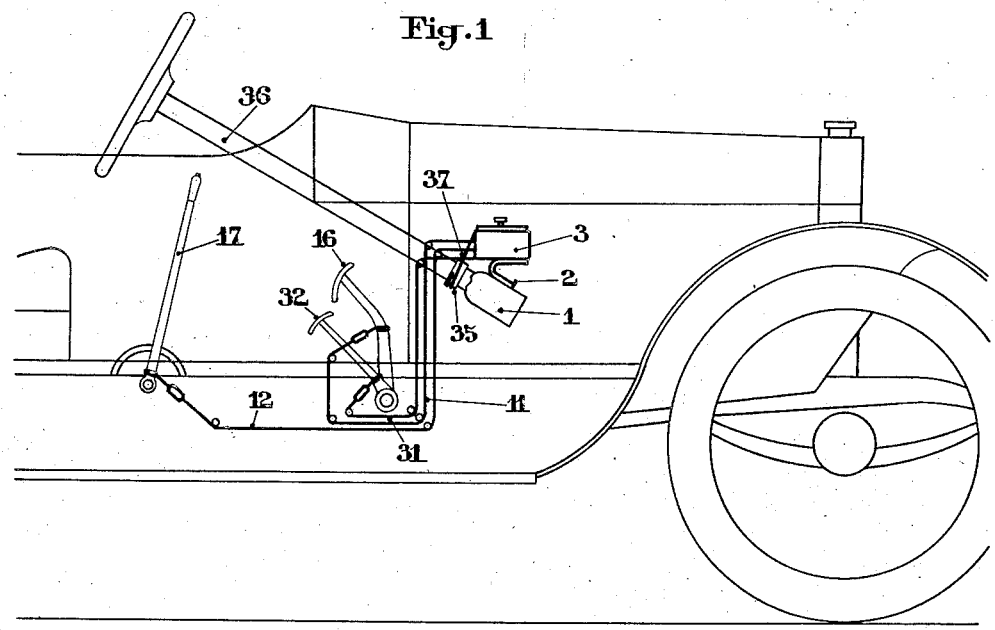
Figure 1 is a partial elevation of a motor car provided with the improved apparatus for signaling by means of electric lamps.

On the steering box 1 there is fixed a bracket 2 on which is mounted the contact apparatus 3 carrying the contacts intended for closing and opening the circuits of the lamps serving as signals. This contact apparatus is made of insulating material. It comprises a cylinder 4 likewise made of insulating material arranged with its axis horizontal. An elongated recess 5 is formed in the wall of the cylinder along the lower generatrix of the latter. In this recess there are located two racks 6. An insulating cylindrical slide-block 7 is mounted in the cylinder 4. This slide-block has a cylindrical cavity 8 the axis of which is horizontal and at right angles to the axis of the slide-block. In this cylindrical cavity there is mounted a spring barrel 9 having external teeth 10 meshing with the racks 6. The slide-block 7 is pierced with two holes parallel to its axis and symmetrical relatively to the latter. Through these holes pass two cables 11 and 12 provided at their adjacent ends with washers 13 and 14 bearing against the end face 15 of the slide-block. These cables pass over guide pulleys and are attached to the brake pedal 16 and brake lever 17. The slide-block 7 is provided with a tappet 18 which engages between the two racks 6.

The contact apparatus 3 comprises also an insulating cylinder 19 with horizontal axis located below the cylinder 4. In the cylinder 19 there is located an insulating cylindrical slide-block 20 provided with a member 21 which is located between the two racks 6 and serves to prevent the slide-block 20 from rotating. This slide-block is pushed towards the right of Figure 2 by a spring 22 mounted in the cylinder 19. In the cylinder 19 there is mounted a screw 23 provided with a rubber buffer 24 intended to take the impact shock of the slide-block 20 when the latter is moved towards the right by the spring 22.

A lever 25 is fulcrumed in the contact apparatus below the cylinder 19. The arms of the lever are made such that their weights tend to cause the end 26 of the lever to rise and the end 27 to move down. The contact apparatus 3 comprises further a cylinder 28 located below the cylinder 19. In the cylinder 28 there is located a slide-block 29 acted upon by a spring 30 that has a constant tendency to move the said slide-block towards the right of Figure 2. A cable 31 is connected to the slide-block 29 in the same manner as the cables 11 and 12 are connected to the slide-block 7. The cable 31 passes round guide pulleys and is attached to the accelerator pedal 32.

As alternatives, the slide-block 29 may be connected by an arrangement of rods either to the control rod of the accelerator or to the accelerator pedal itself. In such cases the spring 30 will not be required.

A pulley 33 having a vertical axis is mounted in a chamber 34 of the contact apparatus 3 located above the cylinder 4. A pulley 35 is fixed on the steering shaft 36. A cable 37 passes round the pulley 33, around two guide pulleys 38 and around the pulley 35 to which it is attached at both ends. The cylinders 4, 19 and 28 are closed by suitable means for instance by screw plugs 39.

The contact apparatus 3 comprises a current connection 40 connected by a wire 41 to the storage battery 42 of the motor car. This current connection is connected to a U-shaped bar 43 located on the apparatus, facing the cable 37 and externally to the latter. Along each of the branches of the bar 43 there is mounted a bar 44. Each of the bars 44 is connected to a current connection 45 connected to the storage battery by a wire 46 on which a lamp 47 is mounted. On the cable 37 there is mounted a key 48 adapted to connect together the bars 43 and 44.

The current connection 40 is connected to a bar 49 capable of coming into contact with a bar 50 mounted on the cylindrical slide-block 7 along a generatrix of the latter. The bar 50 is connected to two arc-shaped bars 51 and 52 which are symmetrical and likewise mounted on the said slide block. The bars 51 and 52 are adapted to come in contact with two bars 53 and 54. The bar 53 is connected to a current connection 55 connected to the storage battery by a wire 56 on which is mounted a lamp 57. The bar 54 is connected to a current connection 58 connected to the battery by a wire 59 on which is mounted a lamp 60. The bar 54 is connected to a bar 61 capable of coming into contact with a key 62 mounted on the slide-block 20 and connected to another key 63 likewise mounted on said slide-block. The key 63 is adapted to come into contact with a bar 64 connected to the current connection 40.

The lamps 47 are located at the sides, and the lamps 57 and 60 are located at the rear. These lamps are mounted in reflectors 65 fitted with a coloured glass window 66 bearing with advantage suitable notices (such as:—Right; Left; Slow; Stop: and a matt glass 67 intended to prevent rays coloured by reflection when the lamp is not burning.

The improved apparatus operates as follows:—

When the driver desires to slow down he operates the brake pedal 16 or the brake lever 17. This operation has the effect of moving, through the medium of the respective cables, the slide-block 7 towards the left of Figure 2. The bar 51, by coming into contact with the bar 53, closes the circuit of lamp 57 which lights up. The movement of the slide-block 7 has the effect of causing the spring barrel to rotate on the racks 6, and consequently tension the spring of the barrel. Therefore when the driver ceases to operate the brake pedal or brake lever, the spring of the barrel will expand and return the slide-block 7 into its original position.

If, on the contrary, the driver wishes to stop the car, he continues to operate the brake pedal or brake lever. In such a case the movement of the slide-block 7 towards the left of Figure 2 continues. The bar 52, on coming into contact with the bar 54 closes the circuit of the lamp 60 which lights up. The tappet 18 moves the slide-block 20 along with it. The keys 62 and 63 come into contact with the bars 61 and 64 respectively. The slide-block 20 moves beyond the end 26 of the lever 25. This end rises owing to the greater weight of the opposite arm of the lever. When the car has stopped, the driver ceases to operate the brake pedal or brake lever. The slide-block 7 moves back to the rear but the slide block 20 is locked in its place by the end 26 of the lever 25 so that the circuit of the lamp 60 remains closed and the said lamp continues to burn.

Figure 2:
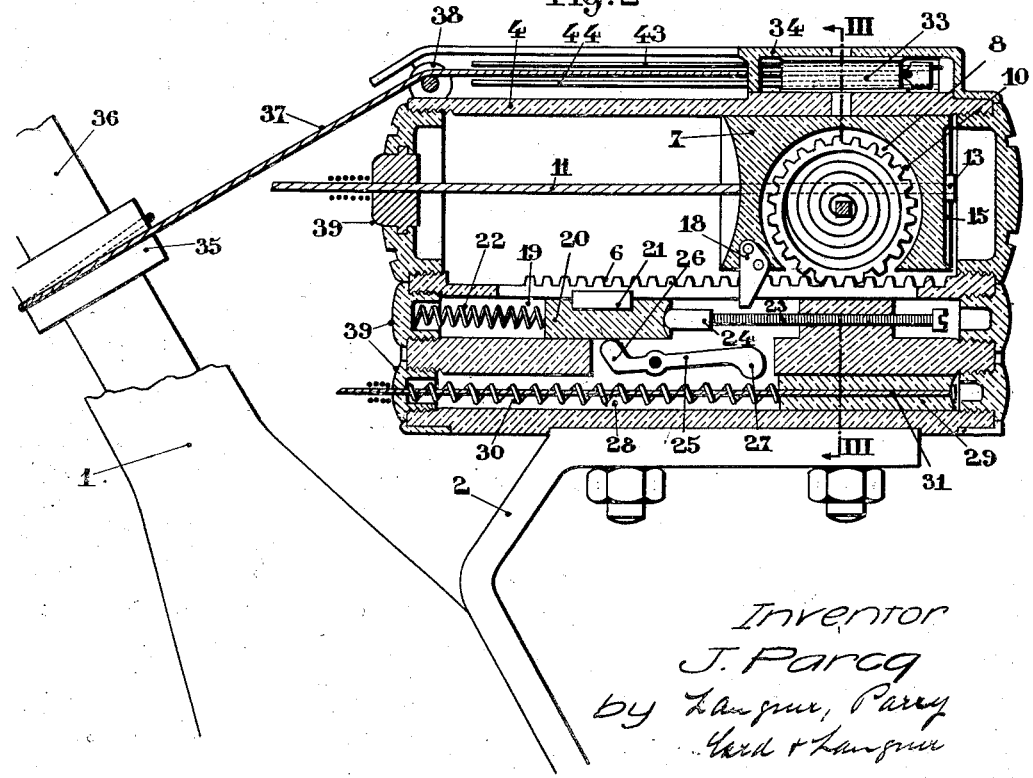
Figure 2 is a section taken along the line II—II of Figure 3.

When the driver desires to start again, he operates the accelerator pedal 32 with the result that the slide-block 29 is moved towards the left of Figure 2 through the medium of the cable 31 (or of the rods employed instead of the said cable). The slide-block 29 raises the end 27 of the lever 25. The end 26 of this lever moves down and releases the slide-block 20 which is returned to the rear by the action of the spring 22. This movement has the effect of opening the circuit of the lamp 60 which is thus extinguished.

When the driver wishes to turn the car, he operates the steering wheel which causes the cable 37 to move in the direction of the turning movement. The key 48 moves, but remains in contact with the bar 43. It comes into contact with one of the bars 44 which it connects to the bar 43 with the result of closing the circuit of one of the lamps 47 which therefore lights up. This lamp continues to burn during the entire duration of the turning movement of the car.

The hereinbefore described apparatus may comprise with advantage a lamp 68 fitted with a reflector 69 for illuminating the plate 70 that bears the registered number of the car. Further, there may be mounted on the wire 41, a switch 71 for the purpose of cutting out the apparatus in open country and consequently the exhaustion of the storage battery. Finally the lamps 47, 57 and 60 may be replaced by electromagnets adapted to bring suitable signals (arrows, arms, plates bearing notices, etc.) into view.

The improved signaling apparatus can render very great services to motor traffic. As a matter of fact all the manœuvres executed by a car provided with this apparatus are signaled automatically and instantaneously to vehicles following behind.

This result which is important in the case of a slowing down, a stoppage or an intentional turning of the car is of still greater importance in the case of an unforeseen incident such as, the risk of collision with a car coming from the opposite direction and travelling on the wrong side, or the sudden realization at night of the existence of unlighted obstructions seen too late to otherwise give warning.

The driver who is then compelled to take a rapid decision has not usually sufficient presence of mind to think of cars that may be following behind.

What I claim is:—

1. A vehicle signaling apparatus, comprising, a normally inactive stop signal, movable means to make the stop signal active, holding means to retain the stop signal in active condition, release means for the holding means operation of which release means permits the stop signal to become inactive, a connection between said release means and the accelerator control of the vehicle whereby operation of the accelerator causes operation of the release means.

2. A vehicle signaling apparatus, comprising, a normally inactive stop signal, movable means to make the stop signal active, holding means to retain the stop signal in active condition, release means for the holding means operation of which release means permits the stop signal to become inactive, a normally inactive slow-down signal, a member movable to make the slow-down signal active, means on the member so that continued movement of the member causes operation of said movable means, means to automatically return the member to its original position upon release of the same, a connection between said member and the vehicle brake control whereby operation of the brake control causes operation of said member, and a connection between said release means and the accelerator control of the vehicle whereby operation of the accelerator control causes operation of the release means.

3. A vehicle signaling apparatus, comprising, a casing, a first, a second, and a third, slidable member in the casing, separate resilient means to normally position each member in a given position, a normally inactive slow-down signal, a normally active stop signal, connections between the first slidable member and the slow-down signal so that operation of the first member makes the slow-down signal active, means causing continued operation of the first member to produce operation of the second member, connections between the second member and the stop signal so that movement of the second member makes the stop signal active, holding means for the second member, the third member being positioned to release the holding member upon operation thereof, said first member having connections for being operated by the vehicle brake operating means and said third member having connections for being operated by the vehicle accelerator operating means.

In testimony whereof I have signed my name to this specification.

JACQUES PARCQ.